United States Patent [19]
Towers et al.

[11] Patent Number: 6,050,089
[45] Date of Patent: Apr. 18, 2000

[54] REMOTELY LOCATED BRAKE BOOSTER

[75] Inventors: Kenneth Scott Towers, Granger, Ind.; Raymond Kosarski, Jr., Niles, Mich.

[73] Assignee: Robert Bosch Corporation, Broadview, Ill.

[21] Appl. No.: 09/122,254

[22] Filed: Jul. 24, 1998

[51] Int. Cl.[7] .................................................. F16D 31/00
[52] U.S. Cl. ............................... 60/329; 60/453; 60/454; 91/431; 91/451
[58] Field of Search ............................ 60/329, 468, 592; 91/431, 451

[56] References Cited

U.S. PATENT DOCUMENTS

| | | | |
|---|---|---|---|
| 2,006,312 | 6/1935 | Ernst et al. | 91/451 |
| 5,960,629 | 10/1999 | McClain et al. | 60/547.2 |

*Primary Examiner*—Edward K. Look
*Assistant Examiner*—Thomas E. Lazo
*Attorney, Agent, or Firm*—Leo H McCormick, Jr.; Warren Comstock

[57] ABSTRACT

A remotely located brake booster for supplying an input force to a pressurizing device to develop pressurized fluid to effect a brake application. The brake booster responds to an actuation signal in the form of pressurized fluid being communicated from a control apparatus activated by an operator. The brake booster has a housing with a bore and a piston located therein to define an operational chamber. The housing has an inlet port through which pressurized fluid from the control apparatus is receiving by the operational chamber. The piston moves from a rest position to an actuation position in response to pressurized fluid being received in the operational chamber to produce the input force for operating the pressurizing device. The brake booster is characterized by an outlet port located in the housing for connecting the operational chamber with a reservoir to allow pressurized fluid to directly flow from the control apparatus to a reservoir by way of the operational chamber to modify the temperature of fluid therein to maintain the viscosity of the fluid at a level sufficient for the piston to return from an actuation position to the rest position within a desired time period and to remove any contamination, including air, that may be present in the operational chamber.

7 Claims, 1 Drawing Sheet

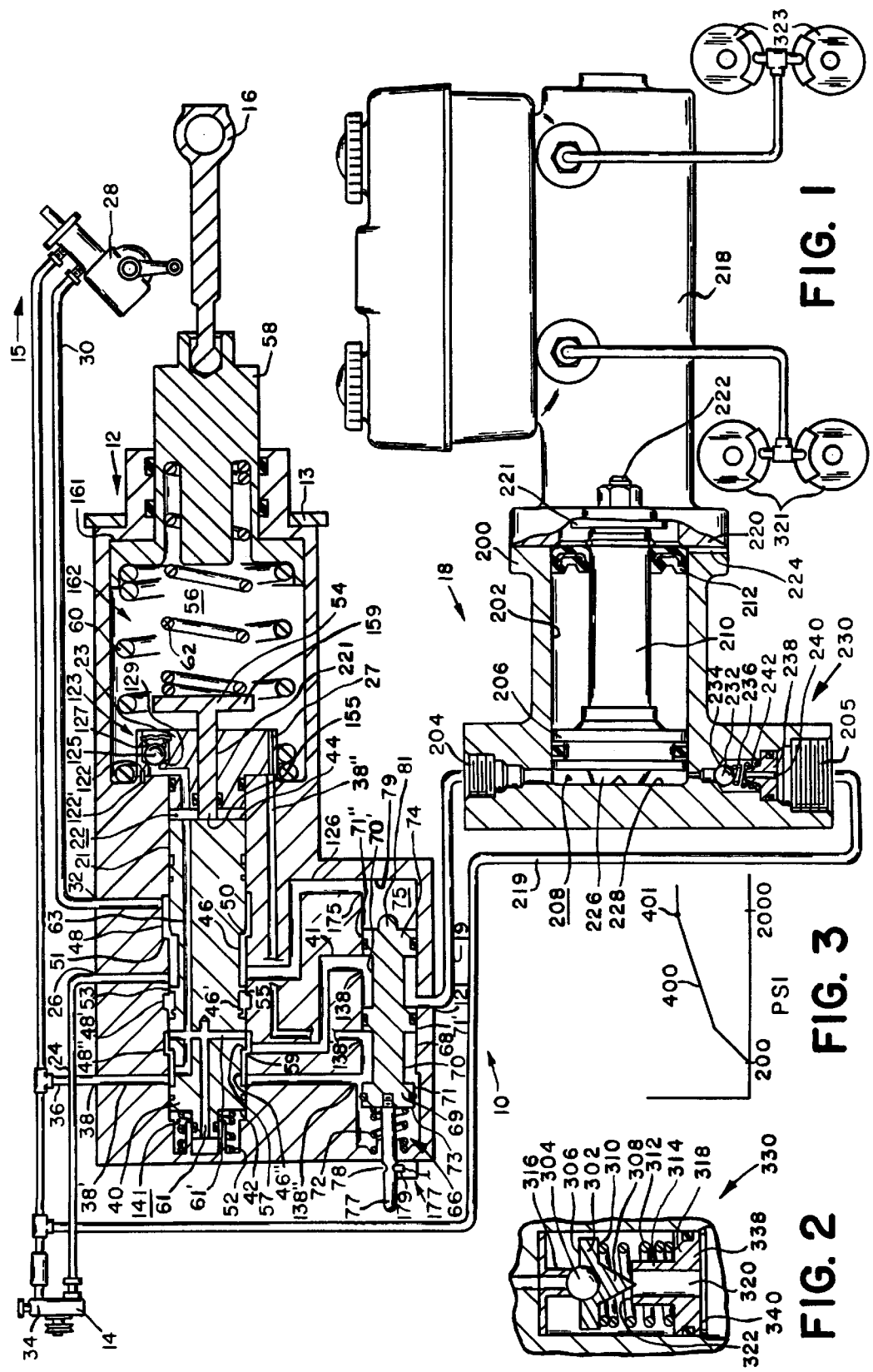

6,050,089

REMOTELY LOCATED BRAKE BOOSTER

This invention relates to a remotely located brake booster having a housing with an operational chamber which receives pressurized fluid from a control apparatus to develop a force and effect a brake application and an outlet port whereby a portion of the pressurized fluid is communicated to a reservoir such that the temperature of the fluid in the operational chamber is sufficiently modified to sustain a desired viscosity in the fluid even when exposed to environmental temperatures approaching 0 degrees Centigrade.

BACKGROUND OF THE INVENTION

Hydraulic brake boosters have been designed to provide an assist in the actuation of a master cylinder where a brake force is developed to effect a brake application. In order to reduce the cost of a hydraulic brake booster, often the same hydraulic power source used to supply a steering gear is used to power a hydraulic brake booster. The controls for such hydraulic brake boosters are designed such that a minimum amount of hydraulic fluid is always available for operation of either the hydraulic brake booster or the steering gear. In certain brake boosters of the type disclosed in U.S. Pat. Nos. 3,967,536; 4,131,055; 4,179,980; 4,514,981; 4,724,674 and 5,442,916, the booster operates by restricting flow from one side of a power piston to the other side of the power piston to create a fluid pressure differential which causes a power piston to move and provide power assisted displacement of the pistons in a master cylinder. In this type of brake booster, the master cylinder and booster are joined together and as a result the overall length occupies considerable under hood space of a vehicle. However, because of the efficiency of such brake boosters they have found application in many vehicles and in particular van and certain mid-sized trucks. In recent vehicle models the physical design of the under hood space is often restricted or reduced, and consequently locating a brake booster and other components is often a difficult task. To better utilize under hood space, it has been suggested as in U.S. Pat. Nos. 5,329,769, 5,313,796 and U.S. patent application Ser. Nos. 09/015,166 and 09/097,778, that certain brake systems components including a brake booster could be located remotely from under the hood. The control valves disclosed in U.S. patent application Ser. Nos. 09/015, 166 and 09/097,778 function in an adequate manner to develop pressurized fluid to initiate a brake application under most conditions, however, should the temperature of the environment in which the remote brake booster is located approaches 0 degrees Centigrade, the viscosity of the fluid is lowered to a level where the time for returning the operational components of the brake booster to a rest position may cause an undesirable drag or engagement between the friction pads and a brake rotor.

SUMMARY OF THE INVENTION

A primary object of the present invention is to provide a remotely located brake booster with a housing having an outlet port connected to an operational chamber such that a portion of the actuation pressurized fluid communicated to an operational chamber is diverted to a reservoir such that the flow of fluid through the operational chamber modifies the temperature of the fluid in the operational chamber to sustain a desired viscosity in the fluid at a level sufficient for the components of the brake booster to return from an actuation position to a rest position within a desired time period.

According to this invention, the brake booster has a housing with a piston located in a bore therein to define an operational chamber. An inlet port in the housing connects the operational chamber with a control apparatus. The piston moves from a rest position to an actuation position in response to pressurized fluid being communicated from the control apparatus to the operational chamber to produce an input force for moving a pressurizing device to produce actuation fluid to effect a brake application. The brake booster is characterized by an outlet port located in the housing for connecting the operational chamber with a reservoir to allow a portion of the pressurized fluid received from the control apparatus to flow to the reservoir and modify the temperature of fluid in the operational chamber such that the viscosity of the fluid is sustained at level sufficient for the piston to return from an actuation position to the rest position within a desired time period. A valve associated with the outlet port prevents the flow of fluid from the operational chamber when the pressurized fluid supplied by the control apparatus is below a predetermined value but modifies the flow of fluid through the outlet port when the fluid pressure is above the predetermined value.

An advantage of a brake system using this invention resides in a reduction in the time required for a return spring to move a power piston from an actuation position to a rest position on termination of a brake application as the viscosity of the operational fluid in an operational chamber is maintained by being warmed by fluid flowing from a control apparatus to a reservoir by way of the operational chamber.

A further advantage of this brake system of this invention is provided by a brake booster housing having a valve which permits limited flow of pressurized fluid from a control apparatus to a reservoir through an operational chamber to modify the temperature of the fluid in the operational chamber sufficiently to maintain a desired minimum viscosity in the fluid.

BRIEF DESCRIPTION OF THE DRAWINGS

FIG. 1 is a schematic illustration of a brake system which includes a brake booster made according to the principals of the present invention;

FIG. 2 is a sectional view of an alternate valve for controlling the flow of fluid from an operational chamber in the brake booster of FIG. 1; and FIG. 3 is a graph illustrating desired flow of fluid through the operational chamber of FIG. 1.

DETAILED DESCRIPTION

The brake system 10 shown in FIG. 1 includes a control apparatus 12 which is mounted on the fire wall 13 of a vehicle. The control apparatus 12 receives fluid from pump 14 in the steering system 15 and in response to an input force supplied by an operator through a pedal rod 16 communicates an operational signal in the form of pressurized fluid to a remotely located brake booster 18 to develop an actuation force to effect a brake application of wheel brakes 321,323 of a vehicle.

The control apparatus 12 which is fully described in U.S. patent application Ser. No. 09/097,778, has a housing 20 with a first bore 21 and a second bore 68 located therein. The first bore 21 is separated into a first chamber 22 and a second chamber 56 by cap means 23. The first chamber 22 is in communication with pump 14 by conduit 24 connected to inlet port 26, with a steering gear 28 (hydraulically operated device) in the steering system 15 by conduit 30 connected to gear port 32, with a reservoir 34 in pump 14 by a conduit 36 connected to relief port 38 and with remotely located brake booster 18 by a conduit 19 connected to outlet port 21 for the second bore 68 which in turn is connected to outlet passage 41 associated with a low flow or selector valve 64.

A spool 40 which is located in the first bore 21, has a cylindrical body with a first end 42 and a second end 44. The cylindrical body has a first groove 46, a second groove 46' and a third groove 46" which are aligned with corresponding grooves 48,48' and 48" in housing 20. A return spring 52 acts on end 42 and urges end 44 into engagement with a stop formed by linkage means 62 connected to pedal rod 16. A first land 50 associated with groove 46 and a first land 51 associated with groove 48; a second land 53 associated with groove 46' and a second land 55 associated with groove 48'; and a third land 57 associated with groove 48" and a third land 59 associated with groove 48" are designed to overlap each other in a radial direction. In a rest position, land 53 engages housing 20 such that fluid under pressure available from inlet port 26 is prevented from being communicated to the second groove 48' to allow unrestricted fluid flow between pump 14 and gear 28. At the same time, lands 57 and 59 are positioned such that free communication occurs between groove 46" and reservoir 34 by way of passage 38' connected to relief port 38. Spool 40 has an operational bore 61 with at least one cross bore 61' which is connected to the third groove 48" in housing 20 and to operational outlet passage 41 connected to the second bore 68. Spool 40 also has a compensation bore 63 which extends from the second end 44 to the third groove 46" such that the first chamber 22 is always in communication with reservoir 34 by way of relief passage 38', relief port 38 and conduit 36.

Cap means 23 has a cylindrical body with an axial opening 21, a first passage 25 and a second passage 27. The axial opening 21 has sufficient length to form a bearing surface for stem 155 on plunger 54 of linkage means 62 to avoid binding or offset loading on movement of spool 40 in response to a desired braking input as applied to pedal rod 16. The first passage 25 extend through the cap means 23 in such a manner as to connect chamber 56 with chamber 22 and provide a flow path for fluid with reservoir 34. A check valve 123 located in the first passages has a ball 125 which is urged by a spring 127 against a seat 129 in the cylindrical body. Spring 127 may not be necessary for all applications but is included to assure that fluid communication is limited to one way communication such that fluid flow is limited to only be communicated from the reservoir 34 to chamber 56. The second passage 27 has a predetermined size to define an orifice which restricts or limits communication of fluid out of chamber 56 to a relief passage 38" connected to the second bore 68. The cylindrical body of cap mean 23 has a tab or pin 122 which engages a corresponding opening 122' in housing 20 to assure that the second passage 27 is aligned with relief passage 38".

Linkage means 162 in addition to plunger 54 includes a piston 58, a second return spring 60 and an actuation spring 62. The second return spring 60 engages housing 20 and urges piston 58 toward a stop 161 while actuation spring 62 is caged between head 159 of stem 155 and piston 58. Piston 58 moves axially within chamber 56 in response to an input force applied to pedal rod 16 to displace fluid therein to the second bore 68 by way of the restricted or second passage 27 in end cap 23 and relief passage 38".

The second bore 68 in housing 20 has a port 175 which receives the same pressurized fluid that bore 21 receives from pump 14 by a passage 126, a control port 138 which is connected by outlet passage 41 to receive operational fluid presented to the third groove 48", an actuation port 138' which is connected to receive fluid discharged from chamber 56 by way of passage 38", and a relief port 138" which is connected to reservoir 34 by way of relief passage 38'. A selector piston 66 located in the second bore 68 has a cylindrical body with a first end 73 and a second end 74. The cylindrical body has a peripheral surface with first 70 and second 70' grooves defined by a plurality of lands 71,71' and 71". The second bore 68 is stepped such that land 71 is normally located in a first diameter section while lands 71' and 71" are always located in and engage a smaller second diameter section. A spring 72 abuts the first end 73 of selector piston 66 and urges the second end 74 toward a pump pressure chamber 75 connected with port 175. An indicator probe 77 attached to end 73 extends through housing 20 to provide a visual indication of the position of selector piston 66 within bore 68.

The brake booster 18 has a housing 200 which is remotely located on a vehicle with respect to the control apparatus 12. The housing 200 has a bore 202 with an inlet port 204 connected to conduit 19 and an outlet port 205 connected by conduit 219 to reservoir 34. Flow from the outlet port 205 to reservoir 34 provides removal of contamination particles present in the operational chamber 208. A piston 206 which is located in bore 202 to define an operational chamber 208 within housing 200 has a shaft 210 that extends through bearing seal 212 into engagement with a piston arrangement 221 in master cylinder 218. Housing 200 is attached to master cylinder 218 by a plurality of bolts 222. Since most often the fluid associated with pump 14 will be different from the fluid in the brake system associated with master cylinder 218, housing 200 has a groove or slot 224 between the end face of housing 200 and an end face of housing 220 of master cylinder 218 to reduce the possibility of contamination. Piston 206 has a projection 226 which is designed to engage the bottom 228 of bore 202 when piston 206 is positioned in a rest position by a return spring (not shown) associated with the piston arrangement 221 of master cylinder 218. A valve 230 located in outlet port 205 has a ball member 232 which is urged against a seat 234 by a spring 236. An end restrictor member 238 retained in outlet port 205 has a central passage 240 with a projection or guide 242 for maintaining spring 236 in alignment with seat 234. Valve 230 modulates the flow of fluid from the operational chamber 208.

FIG. 2 illustrates another embodiment of a valve 330 for modulating the flow of fluid from the operational chamber 208. Valve 330 has a plunger 302 with a ball 304 retained on a first face 306 and a conical projection 308 on a second face 310. A restrictor member 338 retained in housing 200 by snap ring 340 has a guide 314 for aligning a spring 312 with plunger 302. Spring 312 acts on plunger 302 to urge ball 304 toward seat 316 in housing 200 to modulate flow from operational chamber 208. Restrictor member 338 has a cylindrical body 318 with a central passage 320 with a seat 322 which is aligned with conical projection 308. The functional relationship between the conical projection 308 and seat 322 is such that the flow of fluid from the operational chamber 208 is limited as defined by point 401 on the flow curve 400 illustrated in FIG. 3.

Conduit 219 connects the outlet port 205 in housing 200 for the remotely located brake booster 18 with reservoir 34 of pump 14 and defines a flow path to bleed air from the system such that only hydraulic fluid is in system.

Mode of Operation of the Invention

When an engine for a vehicle is running, pump 14 is designed to provide pressurized fluid through control apparatus 12 to the steering system 15. In this operating condition, return spring 52 moves spool 40 to a rest position as shown in FIG. 1, and pressurized fluid is freely communicated from pump 14 to steering gear 28 (hydraulically operated device) by way of inlet port 26, the first bore 21, first grooves 46 and 48, gear port 32 and conduit 30. Land 53 is designed to engage bore 21 such that pressurized fluid is prevented from being communicated to groove 48' while pressurized fluid is freely communicated to chamber 75 in the second bore 68. Pressurized fluid in chamber 75 acts on end 74 of selector piston 66 to overcome spring 72 and position land 71' to allow unrestricted communication between groove 48' and brake booster 18 and at the same time land 71 is located in the larger diameter of the second bore 68 so that relief passage 38" is also connected to reservoir 34 by way of actuation port 138', groove 70, relief port 138" and relief passage 38. During the flow of fluid through the control apparatus 12 some temperature change occurs because of the restriction of flow between the inlet port 26 and outlet port 32.

Should an operator desire to make a brake application, an input force is applied to pedal rod 16 which moves piston 58 into chamber 56. Movement of piston 58 is communicated through actuation spring 62 to plunger 54 which after overcoming return spring 52 moves spool 40 in bore 21. During a brake application, movement of piston 58 in chamber 56 causes a pressure build up of the fluid therein. Since passage 25 is blocked by one way check valve 123, fluid is dispersed from chamber 56 in a controlled manner through restricted passage 27 into relief passage 38 for distribution to reservoir 34 by way of a flow path through the second bore 68 and relief passage 38'. The controlled flow of fluid from chamber 56 provides for a smooth rate of actuation of spool valve 40 as the input force as applied to plunger 54 is modified by both the force of the resilient spring 62 and size of head required to be moved through the fluid. As spool 40 moves in bore 21, lands 50 and 51 move toward each other causing a restriction in the flow of pressurized fluid from groove 46 while land 53 moves past land 55 in housing 20 to initially divert pressurized fluid into groove 48' which is later communicated along a flow path to actuation chamber 48" after land 57 laps land 59 in housing 20. The pressurized fluid in actuation chamber 48 is simultaneously communicated to reaction chamber 41 and flow through chamber 70 formed in the second bore 68 for distribution through conduit 19 and to reaction chamber 41. The pressurized fluid supplied to reaction chamber 41 acts on end 42 of spool 40 to balance the input force applied to end 44 by stem 55 on plunger 54. The pressurized fluid available in conduit 19 is communicated through inlet port 204 to operational chamber 208 and acts on piston 206 to develop a force which is supplied as an input for moving piston arrangement 241 to effect a brake application of wheel brakes 321 and 323. Spring 236 retains ball member 232 in engagement with seat 234 until the fluid pressure available in the operational chamber 208 reaches a predetermine value which in this design is selected to be about 200 psi (1380 kpascal) and as the fluid pressure in chamber increases ball member 232 moves away from seat 234 to allow a portion of the fluid under pressure supplied to chamber 208 to flow through outlet port 205 in a relationship as illustrated by curve 400 in FIG. 3.

With brake booster 18 being remotely located when the temperature of the surrounding environment approaches 0 degrees Centigrade the viscosity of the fluid in the operational chamber 208 decreases. A decrease in viscosity results in an increase in the time it takes the return spring associated with master cylinder piston arrangement 221 to move piston 206 from an actuation position to the rest position shown in FIG. 1 after a brake application. The present invention solves the reduction in viscosity by flowing a portion of the operational or activation fluid for brake booster 18 through the operational chamber 208 during a brake application. The fluid being supplied from the control apparatus 12 is relatively warm and as a result raises the temperature of the fluid in the operational chamber 208 to a level where the viscosity of the fluid therein is sufficient for the return spring to return piston 206 to the rest position within a desired time period. The flow of fluid from outlet port 205 is modulated by valve 230 in a manner illustrated by curve 400 in FIG. 3 such that the actuation of piston 206 is essentially un-effected during a brake application. The flow of fluid through outlet port is limited to a predetermined value as defined by point 401 on curve but the volume of fluid is sufficient to warm the fluid in the operational chamber 208 to provide for a response time within a desire range for the brake booster 18.

When a desired braking application has been completed, the input force applied to pedal rod 16 is removed and return springs 52 and 60 move spool valve 40 and piston 58 to their positions shown in FIG. 1. As piston 58 moves in chamber 56, a lower pressure develops in the fluid therein causing ball 125 to move away from seat 129 and allow fluid from reservoir 34 to replenish or maintain the fluid in chamber 56 at a desired volume. Similarly, the return spring associated with pistons 221 in master cylinder 218 moves piston 206 in the operational chamber 208 to push fluid toward reservoir 34 by flowing through both inlet port 204 and outlet port 205. A majority of such fluid flows through the outlet port 205 to reservoir 34 as valve 230 remains open until the fluid pressure in chamber 208 is reduced to a level below the predetermined value selected by the force of spring 236.

The conical projection 308 shown in FIG. 3 of valve 330 is selected such that the relationship with seat 322 provides for a smooth flow of fluid and a uniform volume of displacement during a brake application without essentially effecting the activation of brake booster 18.

In the event that the engine in the vehicle is not operating and pump 14 is not in a backup mode, pressurized fluid would not normally be available for operating steering gear 28. However in this mode of operation of a vehicle it is desirable to have or maintain braking capability. In this mode of operation, spring 72 in control apparatus 12 shifts selector piston 66 such that land 71 engages the small diameter of bore 68 to block communication from actuator port 138 through groove 70 to outlet conduit and open communication from relief port 138'. To effect a brake application, an input force is applied to pedal rod 16 which moves piston 58 in chamber 56 which because of displacement causes the fluid therein to be pressurized. Since the first passage 25 is blocked by one way check valve 123 the pressurized fluid is communicated through restricted passage 27 to relief port 138 by passage 38". With relief port 138" blocked by land 71 engaging the smaller diameter of bore 68 in housing 20, the pressurized fluid is communicated through groove 70 and outlet port 121 to conduit 19 for distribution to operational chamber 208 in brake booster 18. Since spring 236 holds ball member 232 against seat 234 until the fluid pressure level reaches the predetermined level, all of the manually developed fluid pressure is directed to the actuation of pistons 241 in master cylinder 218 to effect a brake application.

In this no power mode of operation, it is possible to increase the level of the pressurized fluid supplied to brake booster 18 by rapidly moving or pumping piston 58 in chamber 56 as fluid from reservoir 34 is drawn into chamber 56 and the only way out is by flowing through restricted passage 27 to the brake booster 18. The resulting brake application should be sufficient to provide for emergency braking of the vehicle. The pressurized fluid will be retained in the brake booster 18 until pressurized fluid is again communicated to chamber 75 as spring 72 holds projection 81 against stop 79 formed by housing 20 at the bottom of bore 68. Should it be necessary to move a vehicle when this emergency braking operation is effected, visual indicator 77 is pulled to compress spring 72 and dump pressurized fluid supplied to brake booster to effect the brake application by opening a flow path by way of outlet passage 41, groove 48", groove 46" and relief passage 38 connected to reservoir through conduit 36. When pressurize fluid is again developed by way of pump 14, this pressurized fluid will be communicated to chamber 175 and used to develop a force which overcomes spring 72 to move selector piston such that land 71 moves into the large diameter of bore 68 to open groove 70 to relief passage 38 while outlet passage 41 provides a flow path for fluid from brake booster 18 to grove 48" and groove 46" connected to relief passage 38 connected to reservoir 34. The vehicle can be moved and when a destination is reached, pressurized fluid again developed by pumping the pedal rod 16 as described above to produce an emergency braking force to hold a vehicle in a stationary location.

We claim:

1. A brake booster for supplying an input force to a device to effect a brake application in response to pressurized fluid being communicated from a control apparatus, said brake booster having a housing with a piston located in a bore therein to define an operational chamber, said housing having an inlet port for connecting said operational chamber with said control apparatus, said piston moving from a rest position to an actuation position in response to said pressurized fluid being received in said operational chamber to produce said input force, said brake booster being characterized by an outlet port located in said housing for connecting said operational chamber with a reservoir to allow pressurized fluid to directly flow from said control apparatus to said reservoir by way of said operational chamber, said flow of fluid through said operational chamber modifying the temperature of fluid therein to maintain the viscosity of the fluid at a level sufficient for said piston to return from said actuation position to said rest position within a desired time period.

2. The brake booster as recited in claim 1 wherein said brake booster is further characterized by a valve for modulating the flow of fluid though the outlet port.

3. The brake booster as recited in claim 2 wherein said valve is characterized by a plunger with a first face thereon and resilient means for urging said first face toward a first seat to prevent the flow of fluid from said outlet port when said fluid pressure in said operational chamber is below a first predetermined value.

4. The brake booster as recited in claim 3 wherein said plunger has a second face thereon, said plunger acts in response to fluid pressure by moving to allow said first face to move away from said first seat while allowing the second face to move toward a second seat to limit the flow of fluid through the outlet port when the fluid pressure therein approaches a second predetermined value.

5. The brake booster as recited in claim 2 wherein said valve is characterized by a ball which is urged into engagement with a seat to prevent fluid flow from said operational chamber when the fluid pressure therein is below a predetermined value.

6. The brake booster as recited in claim 5 wherein said valve provides for the removal of contamination particles present in said operational chamber as a result of fluid flow through said outlet port.

7. The brake booster as recited in claim 1 wherein said flow of fluid through said outlet port allows for the removal of air from said operational chamber.

* * * * *